Figure 1:
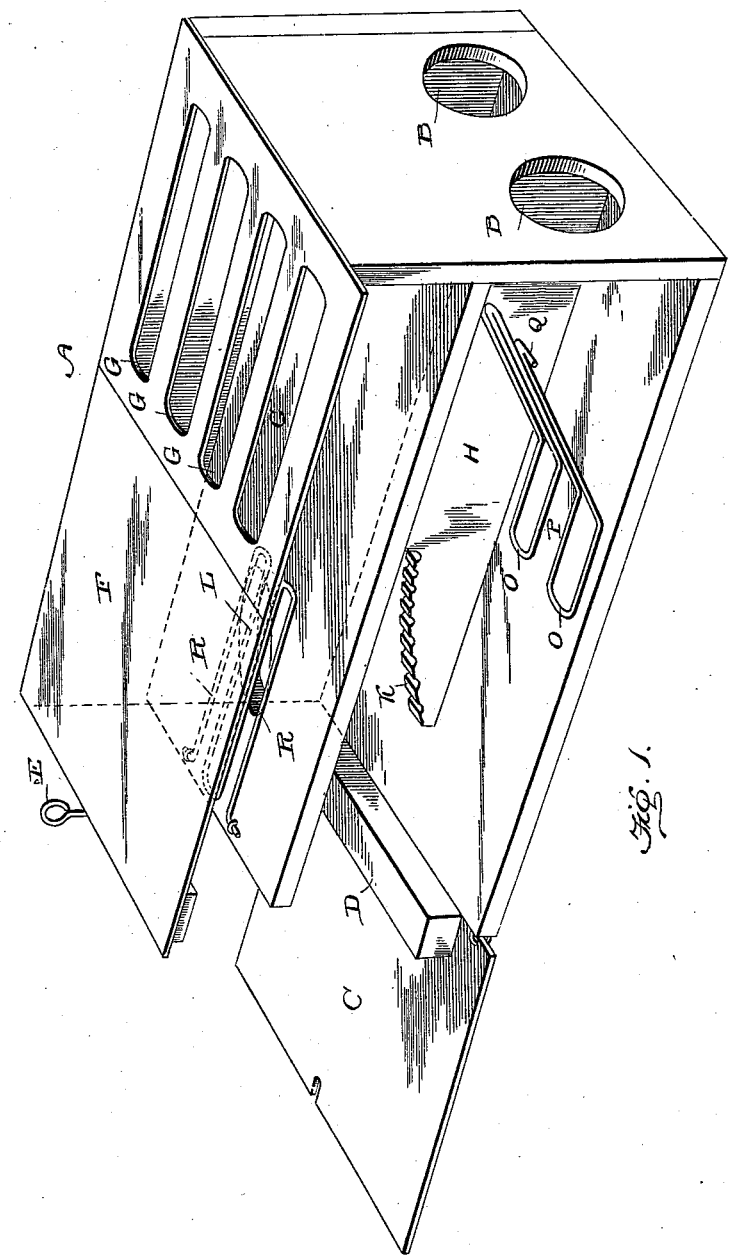

(No Model.)  
H. W. WHITE.  
TRAP.  
2 Sheets—Sheet 1.

No. 549,864. Patented Nov. 12, 1895.

Witnesses  
Hiram W. White  
Inventor  
By  
Atty.

(No Model.) 2 Sheets—Sheet 2.
H. W. WHITE.
TRAP.
No. 549,864. Patented Nov. 12, 1895.
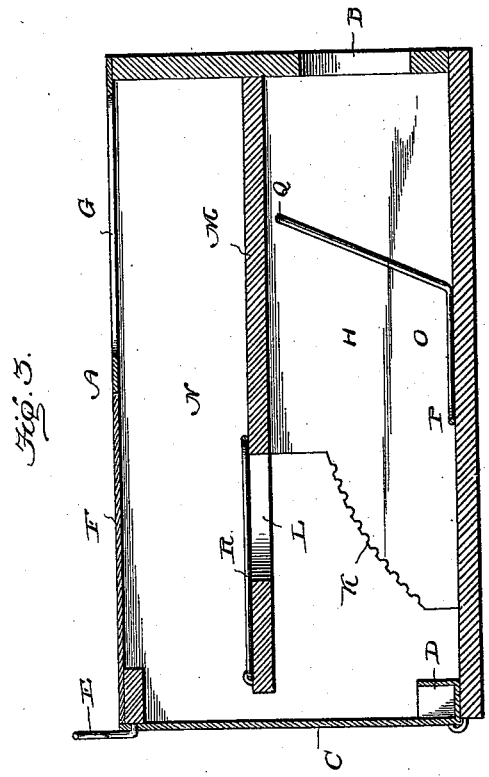
Fig. 3.
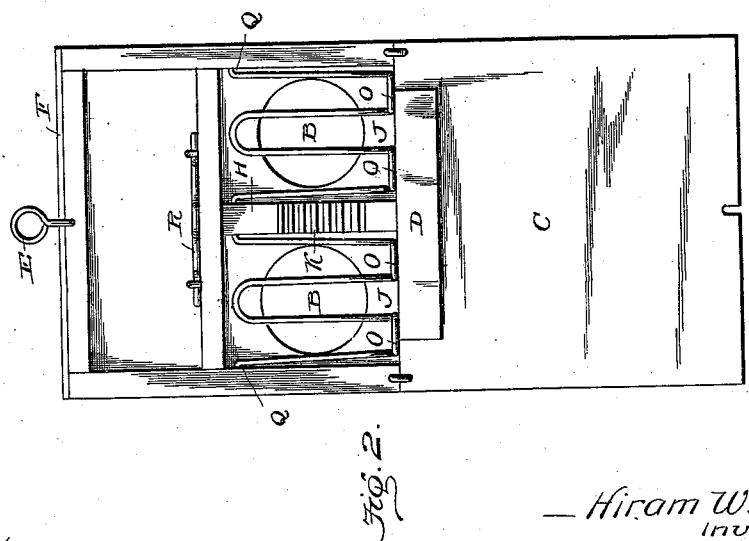
Fig. 2.
Witnesses
Hiram W. White
Inventor
By 
Atty.

UNITED STATES PATENT OFFICE.

HIRAM W. WHITE, OF YANKTON, SOUTH DAKOTA.

TRAP.

SPECIFICATION forming part of Letters Patent No. 549,864, dated November 12, 1895.

Application filed August 19, 1895. Serial No. 559,779. (No model.)

*To all whom it may concern:*

Be it known that I, HIRAM W. WHITE, a citizen of the United States, residing at Yankton, in the county of Yankton and State of South Dakota, have invented certain new and useful Improvements in Traps; and I do hereby declare the following to be a full, clear, and exact description of the invention, such as will enable others skilled in the art to which it appertains to make and use the same.

My invention relates to improvements in traps for catching mice rats, and other animals of like character; and the object of my invention is the provision of a simple and inexpensive trap which will always remain set and which will never fail to operate, thus producing a useful and desirable trap.

To attain the desired object the invention consists of a trap embodying novel features of construction and combination of parts substantially as disclosed herein.

Figure 1 represents a perspective view of my improved trap with one side removed to more clearly show the details of construction. Fig. 2 represents a view from one end of the trap with the end removed to more clearly show the location and arrangement of the trapping devices, and Fig. 3 represents a vertical longitudinal sectional view.

In the drawings, A designates the box or casing of the trap, which is of rectangular shape and of the desired size for the intended purpose, and is provided at one end with the entrance-openings B and at the other end with the hinged door C, provided with the transversely-disposed bait-box D, and this door is secured in closed position by means of the latch or fastening E, and the top F is provided near one end with a series of openings G, the purpose of which is to permit a person to see inside the casing. Arranged centrally in the casing is the vertical partition H, which divides the trap into two alleys or ways J, and the end of said compartment is provided with the curved step portion K, upon which the animal may climb into the opening L of the horizontal partition M, which divides the casing and provides the upper receiving-compartment N.

From this construction it will be understood that the animal enters at the entrance openings or inlets, passes through the alleys or ways to the bait-box, and from whence, after feeding, climbs up the steps into the upper compartment, and to secure or capture the animal I provide the swinging or pivoted trapping devices in the alleys, each of which consists of a single piece of wire bent to form the twin depending loops O, having their lower or closed portion P arranged horizontally and having their terminals Q bearing in the central partitions and side walls of the trap, and over or above the opening of the horizontal partition I provide the pivoted wire trapping device R, which rises to permit the animal to enter the upper compartment and closes the opening after the animal enters and prevents the animal from leaving said compartment.

It will thus be seen that the trap always remains in set position, and that the rats or mice pass through the openings, raise the trapping devices, which fall after being cleared and cannot be moved outwardly, and thus the animal is captured and cannot possibly escape, and it is evident that the trap is simple, inexpensive, and practical.

I claim—

A trap consisting of the casing having the opening at one end, the hinged door at the other end having the bait box formed integral at its lower portion, the vertical and horizontal partitions dividing the trap into an upper compartment and two lower ways or alleys, the curved step portion at the end of the vertical partition and the swinging trapping devices arranged in said alleys and consisting each of a series of loops or arms having their upper portions inclined and their lower ends arranged horizontal and having their terminals bearing in the side walls and central partition.

In testimony whereof I affix my signature in presence of two witnesses.

HIRAM W. WHITE.

Witnesses:
PHIL. K. FAULK,
FRED E. WHITE.